US010080129B2

(12) United States Patent
Seidman et al.

(10) Patent No.: US 10,080,129 B2
(45) Date of Patent: Sep. 18, 2018

(54) METHOD AND APPARATUS FOR INTEGRATED TRACKING OF VISITORS

(71) Applicant: Kiana Analytics Inc., Sunnyvale, CA (US)

(72) Inventors: Glenn R. Seidman, Woodside, CA (US); Klaus ten Hagen, Gorlitz (DE); Nader Fathi, Sunnyvale, CA (US); Sebastian Andreatta, Palo Alto, CA (US)

(73) Assignee: KIANA ANALYTICS INC., Sunnyvale, CA (US)

( * ) Notice: Subject to any disclaimer, the term of this patent is extended or adjusted under 35 U.S.C. 154(b) by 0 days.

(21) Appl. No.: 15/658,323

(22) Filed: Jul. 24, 2017

(65) Prior Publication Data

US 2018/0027383 A1    Jan. 25, 2018

Related U.S. Application Data

(60) Provisional application No. 62/366,276, filed on Jul. 25, 2016, provisional application No. 62/376,064, filed on Aug. 17, 2016.

(51) Int. Cl.
| | |
|---|---|
| *H04W 8/00* | (2009.01) |
| *H04W 8/22* | (2009.01) |
| *H04W 4/029* | (2018.01) |
| *G06K 9/00* | (2006.01) |
| *G06K 9/20* | (2006.01) |

(Continued)

(52) U.S. Cl.
CPC ........ *H04W 8/005* (2013.01); *G06K 9/00335* (2013.01); *G06K 9/00758* (2013.01); *G06K 9/00771* (2013.01); *G06K 9/2054* (2013.01); *G06K 9/78* (2013.01); *H04W 4/029* (2018.02); *H04W 8/22* (2013.01); *G06K 2009/00738* (2013.01); *H04W 24/08* (2013.01)

(58) Field of Classification Search
CPC ..... H04W 4/021; H04W 4/023; H04W 4/025; H04W 4/029; H04W 4/043; H04W 4/21; H04W 8/26; H04W 4/206
See application file for complete search history.

(56) References Cited

U.S. PATENT DOCUMENTS

| | | | | |
|---|---|---|---|---|
| 9,684,835 | B2 * | 6/2017 | Oami | G06K 9/00718 |
| 2008/0159634 | A1 * | 7/2008 | Sharma | G06K 9/00771 |
| | | | | 382/224 |

(Continued)

*Primary Examiner* — Jean Gelin
(74) *Attorney, Agent, or Firm* — Lewis Roca Rothgerber Christie LLP

(57) ABSTRACT

System and method for tracking a mobile device includes: receiving unique identifications for a mobile device; filtering out the unique identifications to obtain a true identifications for the mobile device; identifying cameras relevant to movement of the mobile device; receiving video streams; generating data structures for the video streams and tracking information of the mobile device, the data structure including time stamped videos, and viewpoints of the identified cameras; utilizing the data structures to retrieve, video and tracking information for the mobile device and the user, as the mobile moves in the site; and applying analytics to the retrieved video and tracking information to analyze behavior of the user and to predict what the user will do while on site.

20 Claims, 10 Drawing Sheets

(51) Int. Cl.
    *G06K 9/78*     (2006.01)
    *H04W 24/08*    (2009.01)

(56) References Cited

U.S. PATENT DOCUMENTS

| | | | |
|---|---|---|---|
| 2009/0254971 A1* | 10/2009 | Herz | G06Q 10/10 |
| | | | 726/1 |
| 2012/0249802 A1* | 10/2012 | Taylor | G06K 9/00771 |
| | | | 348/169 |
| 2013/0014145 A1* | 1/2013 | Bhatia | H04N 21/252 |
| | | | 725/13 |
| 2014/0050455 A1* | 2/2014 | Ni | H04N 9/8227 |
| | | | 386/224 |
| 2014/0229835 A1* | 8/2014 | Ravine | H04L 65/60 |
| | | | 715/720 |
| 2015/0051979 A1* | 2/2015 | Knab | G06Q 30/0269 |
| | | | 705/14.66 |
| 2015/0228307 A1* | 8/2015 | Cabanero | G06F 17/30386 |
| | | | 386/241 |
| 2015/0248587 A1* | 9/2015 | Oami | G06K 9/00771 |
| | | | 382/103 |
| 2016/0249180 A1* | 8/2016 | Li | G08G 1/096716 |
| 2016/0335484 A1* | 11/2016 | Xie | G06K 9/00335 |
| 2018/0014150 A1* | 1/2018 | Elias | H04W 12/06 |

\* cited by examiner

FIG. 7

METHOD AND APPARATUS FOR INTEGRATED TRACKING OF VISITORS

CROSS-REFERENCE TO RELATED APPLICATIONS

This Patent Application claims the benefits of U.S. Provisional Patent Application Ser. No. 62/366,276, filed on Jul. 25, 2016 and entitled "Method And Apparatus For Reversing MAC Privacy Settings; and Provisional Patent Application Ser. No. 62/376,064, filed on Aug. 17, 2016 and entitled "Method And Apparatus For Integrated Tracking Of Visitors;" the entire contents of which are hereby expressly incorporated by reference.

STATEMENT REGARDING FEDERALLY SPONSORED RESEARCH OR DEVELOPMENT

The disclosed invention relates to electronically determining visitor traffic and more specifically to a system and method for integrated tracking of visitors to an area and predicting their future behavior.

BACKGROUND

Physical security monitoring and forensics has become a significant concern in the past two decades. With the heightened need for security services in public and private environments, there has been an exponential growth of video information that needs to be reviewed, analyzed and filtered to maintain basic security monitoring. The accelerated pace of security video infrastructure is also placing demands on how to monitor and analyze all the information that is being streamed and stored. Video information is a key component in security and law enforcement to identify and track criminal and suspicious behavior. In most instances, the amount of video footage available at a typical site far exceeds the ability of the manpower needed to review it at the time of occurrence of an event.

In recent cases where the locations are very large and geographically spread out, law enforcement is faced with the considerable task of collecting all video information from all cameras in an area and manually reviewing every frame first to identify the target individuals, then review all videos from earlier time periods to reconstruct their path, and finally stitch together the video stream of an event to reconstruct the entire event. This entire process only captures the immediate aftermath of a given event, providing no clue for intercepting individuals in real time or predicting where they will appear next. It also does not allow for searching archival footage for past visits where the individual in question could be further identified, potential confederates/associates observed, and activities that shed light on preparation work discovered.

Mobile/wireless devices are now commonplace among consumers and are used regularly to search for information, content and data on products and services across all industries. Retail and other enterprise environments can now use information gathered from mobile devices on their premises to engage visitors in more meaningful ways. Providing an entry point for mobile marketing, mobile devices are important to broadcast offers, information and location services to users who are on site or close thereto. However this information has low value if there is no additional information provided about what users are doing on the premise, where they are visiting, what their demographic information is, and pinpointing their needs and interest in a more targeted fashion. Providing an immersive environment where visitors, behavior can be predicted and influenced is a key objective to future retail, restaurant and other service industries.

Users and visitors to retail and other public environments such as transit hubs, hospitals, schools and city streets may be immersed in zones where different types of radio based connectivity and communications points are available. WiFi, Bluetooth, Bluetooth Low Energy, 3G, 4G, LTE and others can provide venues for different means of communication with data and objects around the user. These technologies can provide different forms of information and access to internet data based on smartphone apps, browser based web applications, as well as analysis from visitor metrics collected to identify interests and needs. The providers of these technologies may be carriers, merchants, other enterprises and cities.

These providers can use these technologies to allow local users (both actively or passively) to connect and receive specific information and services in the form of commercial offers, location based services and bandwidth/communications access. The technology providers can collect the user metrics (based on permissions, for example, from their profiles) including social WiFi login details, location and individual demographics for various commercial and customer assistance opportunities. Smartphones and wearable devices ("mobile devices") broadcast and communicate with this infrastructure providing location information and IDs to the network devices located on the premises around them.

Along with this ID and location information, social media such as Twitter™ and Facebook™ can also be used to provide clues to problem events about to happen or currently taking place at large venues. In light of the above excessive manpower requirements and error-proneness in current physical security monitoring, there is a need for a method and system that can automate real-time monitoring and facilitate post-event forensics by integrating, analyzing, filtering and performing analytics on all of these information that includes streams video, IDs with location, and information from social media.

SUMMARY

The disclosed invention manages integrated coordinate tracking information, video information, and social media information and incorporates a query language to facilitate the retrieval of objects (information) from various perspectives and declares rules and their associated triggers to perform specific processing when some an event is triggered.

In some embodiments, the disclosed invention is a method or non-transitory computer storage medium including a plurality of instructions for tracking a mobile device in a site. The method includes: receiving, in real time, a plurality of unique identifications for a mobile device vising the site; filtering out the plurality of unique identifications for the mobile device to obtain a true identifications for the mobile device; in real time, identifying cameras relevant to movement of the mobile device responsive to the true identifications for the mobile device; receiving video streams of the movement of the mobile device from the identified cameras, time stamping the received video streams and storing the time stamped video streams in a computer storage medium; generating data structures for the video streams and tracking information of the mobile device, the data structure including time stamped videos, and viewpoints of the identified cameras; utilizing the data structures to retrieve, in real time, video and tracking information for the mobile device and the user, as the mobile moves in the site; and applying analytics to the retrieved video and tracking information to analyze behavior of the user and to predict what the user will do while on site.

In some embodiments, the disclosed invention is a system for tracking a mobile device in a site. The system includes: a plurality of cameras coupled to a computer network; a wireless access point for providing access to the computer network; a computer storage medium for storing information; and a server coupled to the computer network for: receiving, in real time, a plurality of unique identifications for a mobile device vising the site, from the wireless access point via the computer network; filtering out the plurality of unique identifications for the mobile device to obtain a true identifications for the mobile device; in real time, identifying relevant cameras from the plurality of camera relevant to movement of the mobile device responsive to the true identifications for the mobile device; receiving video streams of the movement of the mobile device from the identified relevant cameras, time stamping the received video streams and storing the time stamped video streams in the computer storage medium; generating data structures for the video streams and tracking information of the mobile device, the data structure including time stamped videos, and viewpoints of the identified cameras; utilizing the data structures to retrieve, in real time, video and tracking information for the mobile device and the user, as the mobile moves in the site; and applying analytics to the retrieved video and tracking information to analyze behavior of the user and to predict what the user will do while on site.

The data structures may further include a user of the mobile device, regions of interests of the user of the mobile device, a list of one or more tracking events, video events, social events, area events, web request events, partner events, trackables, cameras, social threads, and areas, and wherein each list includes identifications that reference said each list. The prediction of what the user will do while on site includes one or more of predicting a future travel path of the mobile device, predicting what web sites the user will visit, and what products or services the user is likely to purchase and may be used for providing products, services and offers, product placement and management, staffing support and scheduling, security or law enforcement services, and/or object or person tracking.

In some embodiments, the disclosed invention further identifies previous paths of the user, matches the previous paths with the video streams of the movement of the mobile device for further identification of the user, and generates alert information when the user returns to the site.

BRIEF DESCRIPTION OF THE DRAWINGS

These and other features, aspects, and advantages of the present invention will become better understood with regard to the following description, appended claims, and accompanying drawings.

FIG. 7 is an exemplary display screen depicting images from all locations where the targeted devices were seen, according to some embodiments of the disclosed invention.

DETAILED DESCRIPTION

In some embodiments, the disclosed invention augments and improves physical security monitoring technology and the storage of monitoring information, which may include identifications coupled with locations, video, and social media in order to beneficially realize automated real-time triggers and notifications, as well as improve forensic analysis technology. This beneficially realizes much less error.

In some embodiments, the device and method of disclosed invention filters out the unwanted observations from a measurement system that is seeking to identified the mobile devices on a location and measure the traffic and its nature for the site. The invention identifies real (same) devices and observations from the masking random devices and observations, and filters the masking random devices and observations from the results.

In some embodiments, the device and method of disclosed invention electronically detects and measures visitor traffic for a site, applies correction filtering to the measurement data for higher accuracy, and analyzes the filtered data to apply analytics to analyze behavior of the users/visitors and optionally to predict what users will do while on site. The technology may be used in retail, public and government places, service organizations, entertainment industries/venues, security and law enforcement applications and the like.

In some embodiments, the device and method of disclosed invention link location and user information from mobile devices (including smartphones, mobile computers, and wearable clothing and other wearable devices) that provide their IDs by wireless communications, with video storage devices to capture the time stamp details from a video stream, to provide rapid analysis and real time predictive/alert information as well as forensic details for later analysis. Using analysis of information captured from mobile users allows insights into visitor patterns and can be used for forensic and context analysis of the event. Further, all the video from the time of the event can be packaged for electronic delivery to law enforcement, security, insurance and product promotion organizations for further analysis and prosecution.

Figure 1:
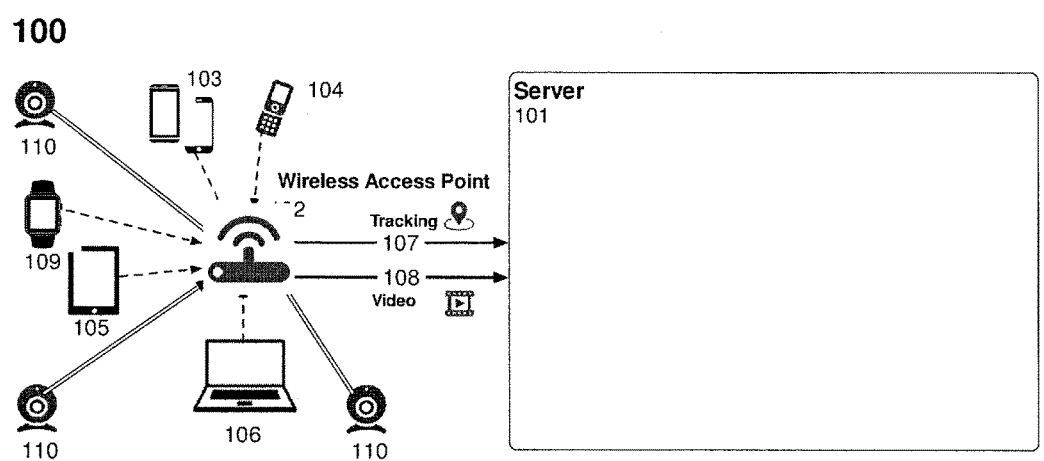
FIG. 1 Illustrates an exemplary environment, according to some embodiments of the disclosed invention.

FIG. 1 Illustrates an exemplary environment, according to some embodiments of the disclosed invention. As shown, a server 101 is deployed as a listener to streams of information in a wireless area network 102 system. The streams of information arrive as tracking data 107 and video (or image) data 108. The Tracking data 107 is generated by any wireless device such as smartphone 103, simple cellphone 104, tablet 105, laptop 106, smart watch 109, or any other similar device. Multiple video streams are also generated, one video stream per camera 110, which is deployed in a specific locale. The server 101 aggregates these streams to produce many objects that represent an organized structure of tracking and video clip segments in various meaningful ways to represent a "story" or scenario.

The server 101 performs the above-mentioned stream aggregation of information together as a means to provide a complete detail of the scenario on various specific objects of interest. Examples of objects of interest include: a person, a group of people, a camera's viewpoint, and specific areas or regions of interest. In some embodiments, the server combines this information with time stamped video information recorded by cameras 110 and other video/audio capture devices, if any. By accessing the recorded video information from a database connected to the Internet or video recording storage device, the system can facilitate quick analysis and filtering of video streams of individuals involved in a targeted event and display them on a single screen to show both the locations of individuals on a map and the associated video streams from cameras in the path of the individuals to view their progress. In some embodiments, the invention depicts the predicted behavior (e.g., a predicted future path of the individuals) on a map on a display screen.

In some embodiments, the electronic measurement system and method of the disclosed invention allow enterprises, merchants and service providers greater control over the information from visitors and what the visitors are doing when using their mobile devices on site. In some embodiments, information is captured on visitors' traffic, duration of their stay on the site, physical and web locations visited by them, and details from social WiFi login, apps used, and web browsing actions. In some embodiments, the information is captured in real time for immediate application to analytics, services and/or products. Pooling this information from different sources (point of sales terminals, iBeacon devices and/or WiFi access points) enables the invention to analyze the behavior of the visitors and predict what the visitors will do, based on different metrics and prior visits to the site or other sites. This information can be used to provide services and offers but can also be used by the location staff for different goals such as inventory/product placement and management, staffing support and scheduling, security/law enforcement services, object or person tracking on site (child, equipment, cleaning crew, VIP) and site layout and therefore improves inventory management, labor and employee management technologies, security and identification technologies, and lost-and-found technology, for example.

In some embodiments, the information is collected via log analysis of third party devices as well as inline traffic inspection software and devices. For example, by looking at URLs, DNS and all destinations to determine interests and looking at searches performed by the individuals, products viewed and types of locations visited, a consolidated view of a user's online mobile browsing behavior (what websites to visit or visited) can be collected for post processing. Then, what product and service the user is likely to purchase can be predicted from the user's behavior pattern.

The analytics information also provides details on real time traffic movements that can be displayed, for example, as heat maps. Heat maps (real-time, historical, dwell and frequency of visit metrics) to determine locations of interest are generated for the merchant or the law enforcement. In some embodiments, the invention animates heat maps to show real time tracking, visitor density location popularity and flow analysis of the visitors within the site's infrastructure range. Animated heat maps provide a directional vector to support location finding services that can be zoomed in to unique individuals or equipment and to identify traffic directional movements.

In some embodiments, the information derived and assembled by the disclosed invention includes presence analytics, such as total visitor traffic, dwell time duration, real time visit capture rate and the like; loyalty analytics, such as repeat visitors, visit frequency and duration, how recent were the visits, and the like; engagement analytics, such as conversion and bounce rates, social WiFi demographics, visitor contact information, and the like; and WiFi usage analytics, such as websites visited, page views, product/price views, and the like.

The invention provides quick matching and recognition of device IDs and the time stamps that the device was seen by a location's wireless infrastructure with the time and location information to rapidly access the associated video information captured by security and other digital video recording equipment from the same location as the wireless infrastructure devices. Matching this information can be done in real time, to quickly identify the target ID to track, access the camera observation information from other locations where the wireless infrastructure viewed the target individual or individuals and, using advance path analysis, predict the paths where the individuals may appear next in order to focus efforts on those local security cameras.

The same information may be used to look back in time to identify the original and previous paths of the targeted individual, provide notification of origination details, for example, where the person parked their car upon arrival, and identify any accomplices. Review of the archive of past visit history (e.g., from a database) can be quickly matched with the video streams from those visits in real time for further identification of the user and potential past confederates. Alert information of future visits, can also be provided for future use in case a targeted individual or confederates return. Alert information may include a sound alert signal, a visual alert signal, photos of the targeted individual or confederates, any information about targeted individual or confederates, and/or their past behaviors.

Information garnered from visitors can also be used to trigger or transmit messages from interactive terminals and digital signage screens that can be tailored to the user based on the goals of the site, to provide an immersive experience that is customized to the visitor. For example, using specific data from the analytics processes and user specific information captured and cataloged from WiFi sensors that identify active WiFi signals from devices. Examples of WiFi sensors include Bluetooth sensors and RFID sensors that sense active devices in their respective frequency ranges, access points, social login details and/or cameras allows specific triggers to be generated. The triggers are designed to be sent to media and content servers in order to change the content presented on the digital signage to the specific user. By locating the user near a specific digital sign and using the customer specific information of their location and other identified details (from social media, other analytics information from this and past site visits), the invention allows targeted content to be presented on the digital sign. Current digital signage systems have a media server and/or content delivery network to program content to be displayed at a location in a preprogrammed fashion. Triggers generated from knowledge of the customer through analytics can request from the system that a very specific message be displayed in real time to the local user.

The information can also alert merchants to user behaviors that affect their sales and provide them with different means to communicate offers or improved branding and loyalty opportunities for their visitors. In other cases, visitors may use their internet access within stores, to compare prices and shop online without purchasing from the brick and mortar store ("showrooming").

When searches are conducted on premises, the merchant or vendor is at a disadvantage to online product vendors because they cannot control what the consumer is doing online in their store. By utilizing a captive social WiFi offering according to some embodiments of the invention, the merchant can provide access to the internet to users but can now control the access provided and receive information on product and price data that users are searching, and provide competitive offers or services as alternatives before the user leaves or purchases from the online vendor.

Typical consumer behavior while on a (retail) site is to search for products from competitors, pricing, reviews, coupon offers and competitive alternatives. The merchant/vendor can use the technology of the disclosed invention to intercept and monitor the searches and product/price views through the technology's capture and display function. In some embodiments, the invention provides additional features to enable the merchant to send an alternative price, product, competitive service or solution, to the consumer. In some embodiments, the invention features additional capabilities to filter, preset and send various offers, ads to the mobile device, and combined with the digital signage feature, to display relevant information to engage the consumer while they are still on location.

Figure 2:
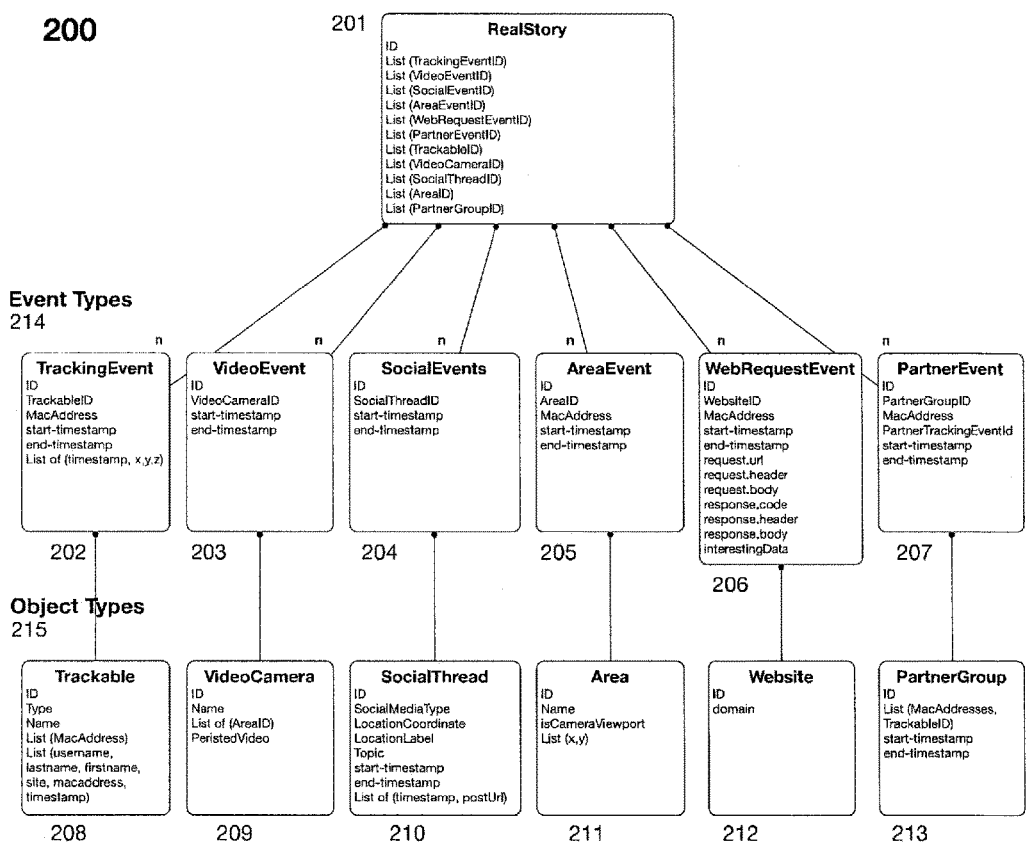
FIG. 2 depicts a RealStory object and its content, according to some embodiments of the disclosed invention.

FIG. 2 depicts a RealStory object structure and its content, according to some embodiments of the disclosed invention. As shown, a "RealStory" object 201 comprises a list of TrackingEvents 202, list of VideoEvents 203, list of SocialEvents 204, list of AreaEvents 205, list of WebRequestEvents 206, list of PartnerEvents 207, list of Trackables 208, list of VideoCameras 209, list of SocialThreads 210, and list of Areas 211. Each of the lists include IDs that reference the objects uniquely. Note that the first four Event Types 214 reference associated Object Types 215 such that all associated Object Types 215 can be retrieved from the Event Types 214. In order to perform the opposite, one may retrieve the associated Event Type 214 objects for a given Object Type 215 by submitting a JOIN query with the Object Type's ID and the Object Type ID field in the Event Type 214. For example, Object Type IDs are TrackableID, VideoCameraID, SocialThreadID, etc. which are maintained in the Event Type 214 structures.

Some embodiments of the disclosed invention uses these unique IDs to refer to objects in a database wherein the ID may be employed to look up a row in a relational table in order to retrieve the object corresponding to the ID for a specific Object Type 215. In such embodiments, each table corresponds to a specific Object Type 215, for example, TrackingEvent 202, VideoEvent 203, SocialEvent 204, etc. Also, Trackable 208, Camera 209, etc., would each represent an Object Type (or class in an object oriented environment) and are included in a table for each Object Type 215. Such tables may be implemented in any type of database.

Some embodiments of the disclosed invention employ TrackingEvent 202 which are comprised of a TrackableID that corresponds to a person or object that is trackable. While a Trackable 208 is most often a person with a wireless device, it might be an inanimate object with a wireless device that can be tracked by the server 101. Typical equipment that is WiFi enabled includes medical equipment used in hospitals that use WiFi to connect to and update an EHR database for a patient, in commercial settings, devices such as printers, portable sales terminals (such as a tablet with an attached credit card reader), inventory scanners, and hand held data input devices used in factories and retail stores to upload information to a cloud based database.

In some embodiments, a Trackable 208 may have multiple associated media access control (MAC) addresses. This is because it actually has multiple such addresses, but it could also be because it was given a new wireless device associated with it to replace an earlier one. The invention records and stores this relationship to maintain for Trackables 208.

In some embodiments, a TrackingEvent 202 identifies the primary Trackable 208 and includes a specific MAC address identifying a Trackable 208 device along with a history of locations listed with (timestamp, x, y, z). The Trackable 208 may also maintains a List of TrackingEventIDs since each TrackingEvent 202 stores a Mac address with the (x, y, z) coordinate path it traversed over a time period.

In some embodiments, the disclosed invention maintains a Trackable 208 that denotes the type of the Trackable 208 and a name which is unique across all Trackables. A Trackable may also be generically "StationaryObject" but more specifically "Label" or "PriceTag". The invention may employ any collection of descriptive Object Types 215.

Some embodiments of the disclosed invention include a list of six associated information facts comprising (Username, Lastname, Firstname, Site, MAC address, Timestamp) in the Trackable structure 208. This provides the very important association of a username and Lastname+Firstname to a MAC address, which ultimately provides knowledge of precisely who is present and moving around. Once skilled in the art would recognize that the disclosed invention is not limited to a list of six associated information facts, rather, other numbers of associated information facts are possible and within the scope of the present invention.

In some embodiments, the disclosed invention maintains a VideoEvent 203 that refers to a specific VideoCameraID along with the start and end time of the video. The camera referenced in the VideoEvent 203 may be employed to look up the actual video clip from a Video Object 209, wherein the video clip is extracted from the stored video based on the start and end time. The Video Object 209 may also have a unique name or ID. The Video Object 209 being associated with a specific camera, also contains a list of AreaIDs 211 that corresponds to the exact areas, and hence, (x, y) locations for which the Camera sees the object(s). Thus, these camera areas are used to know when a TrackingEvent 214 traverses where a camera has sight. This may be achieved when each Video frame is stored with its timestamp or the time that a frame was taken can be computed based on an assumption that each frame was recorded at a regular interval, for example 30 frames per second.

Some embodiments of the disclosed invention retrieve the video clip using a video management system (VMS). In this case, the video clip is retrieved with a start and end time. The VMS provides retrieval of a video clips based on VideoCameraID and start and end time.

Some embodiments of the disclosed invention incorporate a SocialEvent 204 that includes a SocialThreadID 210 and start and end timestamp. A SocialThread Object 210 comprises a SocialMediaType that corresponds to one of the well-known social sites where posts and various interests are shared, such as Facebook™, Twitter™, YouTube™, or others. It also includes a Topic attribute that gets computed based on analysis of posts in the thread. The posts may be stored as a list of (timestamp, postUrl) pairs, one for each post or submission to such a social site. This provides the means for a SocialEvent 204 to be defined that has a more precise time period than the entirety of a SocialThread 210 that may comprise less important items.

Some embodiments of the disclosed invention incorporate an AreaEvent 205 which includes an AreaID, the MAC address that was present in the area, and the start and end timestamps for which the tracking information was present in the AreaEvent 205. The AreaEvent 205 facilitates a summarization of where the RealStory 201 in question occurred and at what date and time. This is also useful for, not only an overview of where somebody traversed, but also for triggering some rules. The AreaID refers to an Area object 211 stored in the Area table. Area objects 211 includes a name, acting as a label, and a List of (x, y) coordinates that represent a closed region.

Some embodiments of the disclosed invention incorporate an Area object 211 that has a Boolean "CameraViewport" denoting whether or not the area represents a camera viewport. Some embodiments of the disclosed invention manage a WebRequestEvent 206 that represents a single HTTP request. It maintains a WebsiteID that is associated with a Website object 212. Having this Website object 212 association provides easy query and analysis per Website across all WebRequestEvents 206. WebRequestEvent 206 may also include a start-timestamp for when an HTTP request was made along with the request URL, request header, and request body, and an end-timestamp for when the responses are received. A WebRequestEvent 206 may also include the response code, a header and a body. The WebRequestEvent 206 may also include a computed "InterestingData" field which stores a dictionary of interesting request and response parameters and their values. This simplifies obtaining the data of interest from WebRequests. The "InterestingData," including information for username, site, last name, and first name, is copied to the corresponding Trackable object 208 as well.

Some embodiments of the disclosed invention incorporate a PartnerEvent 207 when another MAC address has been determined to correlate (travel together) with one of the TrackingEvents 202 per included TrackingEventID. The PartnerEvent 207 also includes a start and an end timestamp to denote the portion of the TrackingEvent 202 that the Partner was correlated with the TrackingEvent 202. In such embodiments, it is possible that there may be more than one PartnerEvent 207 which may represents a group of more than two people found to have traveled together.

Figure 3:
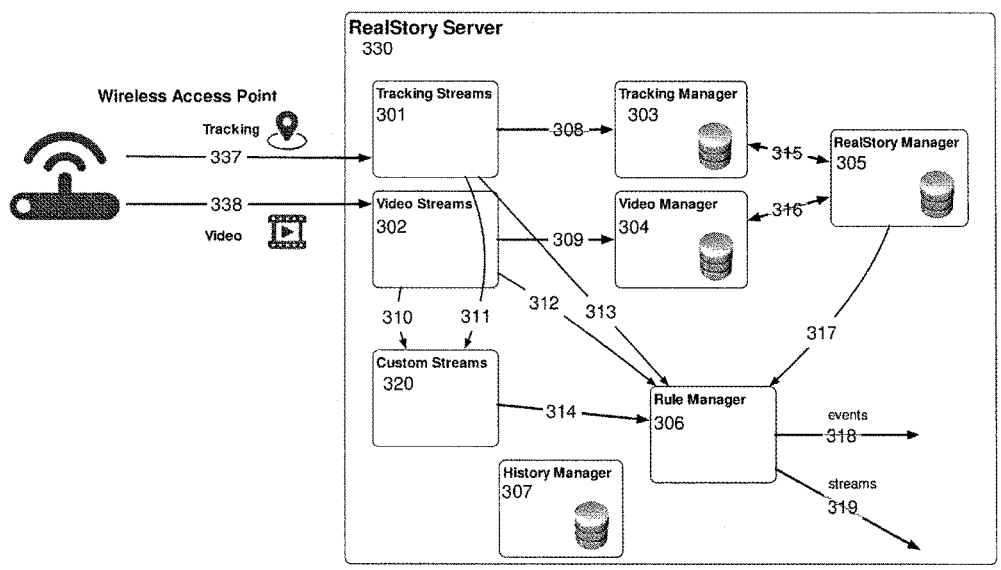
FIG. 3 illustrates exemplary subsystems of a server, according to some embodiments of the disclosed invention.

FIG. 3 illustrates exemplary subsystems of a RealStory server, according to some embodiments of the disclosed invention. As shown, a server 330 continuously listens to a wireless access point 332 for the incoming tracking information 337 and video data streams 338. A tracking streams subsystem 301 and a video streams subsystem 302 preserve the order of the incoming tracking and video data in the order it arrives so that the incoming events can be examined for further processing by a custom streams subsystem 320 or a rule manager 306. The custom streams subsystem 320 provides the means to deploy custom processing to transform the raw tracking stream 301 and raw video stream 302 into other kind of meaningful data streams. All of these data streams are directed (312, 313, and 314) to a rule manager 306 which in turn, emits events 318 and/or additional streams 319 of events.

The rule manager 306 is able to recognize specific events or patterns of events, which may even be restricted to occur in a time window, in order to emit further events 318 and streams 319 of events. The rule manager 306 may also employ state read 317 from a RealStory manager 305. The RealStory manager 305 references and retrieves stored video clips as necessary to store and maintain RealStory object structures. A tracking manager 303 stores the incoming data from the tracking streams 301. Similarly, a video manager 304 stores the incoming video streams 309. In some embodiments, all subsystems log occurrences that take place to maintain an audit via a History Manager 307. The RealStory manager 305 also maintains the ability to retrieve (315, 316) the necessary tracking and video objects from their respective managers (303 and 304), as necessary.

Figure 4:
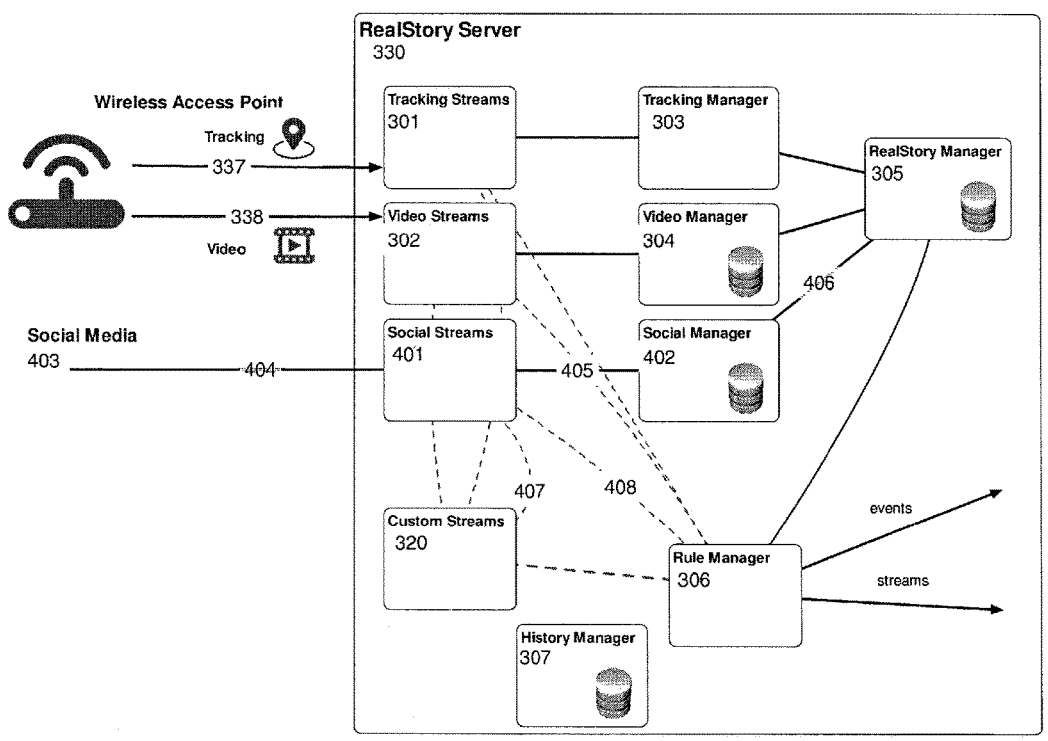
FIG. 4 shows a server with social media streams integrated, according to some embodiments of the disclosed invention.

FIG. 4 shows a RealStory server with social media streams integrated, according to some embodiments of the disclosed invention. As shown, a server 330 is integrated with a variety of social media 403. In this case, the social media 403 provides SoicalMediaEvents 404 in a Social media stream 401 to a RealStory manager 305 for reception by a social streams subsystem 401. This subsystem then stores each SocialEvent to the social manager 402. The Objects stored in the RealStory manager 305 may reference social media. Additionally, social streams 401 comprising SocialMediaEvents are streamed to a custom streams subsystem 407 as well as the rule manager 306 for rule processing. The rest of the subsystems depicted in FIG. 4 operate similar to those illustrated in FIG. 3.

Some embodiments of the disclosed invention include various adaptors to interface to various social media. This provides a unified architecture for multiple social media and sharing services implementations.

Figure 5:
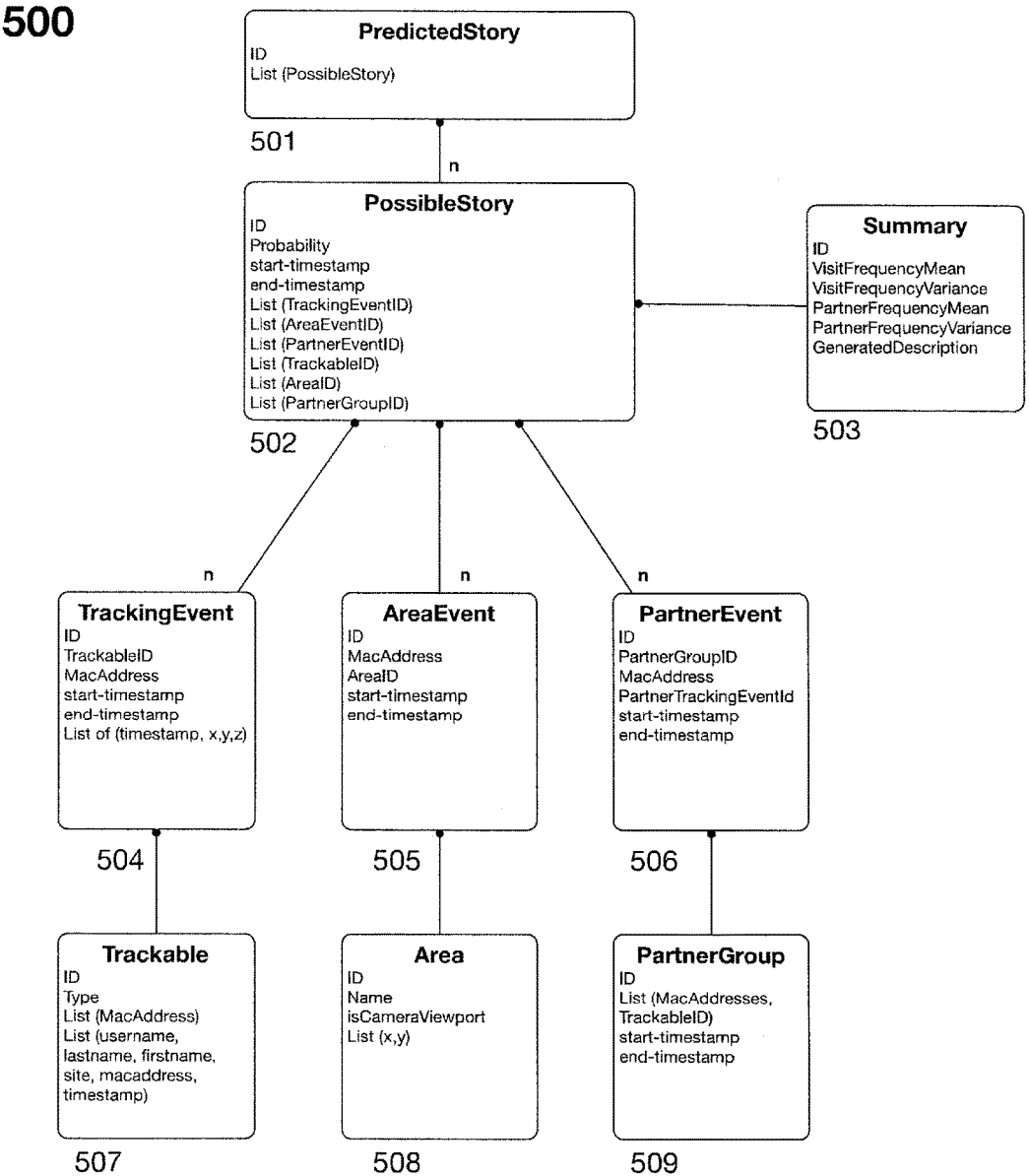
FIG. 5 depicts a predicted object and its probabilistic content, according to some embodiments of the disclosed invention.

FIG. 5 depicts a predicted object and its probabilistic content, according to some embodiments of the disclosed invention. In these embodiments, while the object may be similar to the object 201 of FIG. 2, its core content emphasizes a PossibleStory object 502 comprising a probability, a start-timestamp, and an end-timestamp, as well as a subset of a RealStory object containing TrackingEvents, AreaEvents, and PartnerEvents. Each PossibleStory object 502 also comprises a Summary object 503. The probability is a percentage from 0 to 99.9999% expressing the probability of the PossibleStory object 502 to take place in the future over the period start-timestamp to end-timestamp. All timestamps on reachable object children from a PossibleStory object 502 should be limited to be within the PossibleStory object 502 start and end-timestamps. A PredictedStory object 501 references multiple PossibleStory objects 502 and the probabilities across PossibleStory objects 502 for a specific time period should add up to 100%.

In some embodiments of the disclosed invention, the Summary object 503 also includes means and variances of past behavior associated with Event Type objects. For example, an embodiment employing a Summary object 503 provides visitation frequency mean and variance wherein the summary object 503 would be associated with an AreaEvent, which represents the visitation destination. This summarized past behavior is useful for prediction under the assumption that past behavior generally repeats itself. Thus, since a Summary object 503 is associated with a PossibleStory object's probability, any regular past behavior may be assigned 99.9999% probability. As another example, two different behaviors may be characterized in two distinct PossibleStory objects 502, each with a probability percentage based on the percentage of times they each occurred.

Some embodiments of the disclosed invention, perform sophisticated analysis on TrackingEvent paths and incorporate a Summary object 503 associated with predicted TrackingEvent paths. Any number of methods may be employed to generate the predicted path. For example, an embodiment may compute an average of similar multiple paths across multiple time periods found and assigns small probability to paths that are taken once or a few times.

In some embodiments of the disclosed invention, the Summary object 503 may further include means and variances of past grouping behavior with others such that the Summary object 503 would be associated with a Partner-Event.

Some embodiments of the disclosed invention include a "GeneratedDescription" attribute which is filled in with arbitrary text generated by the embodiment that may include not only mean and variance of frequencies but also any other past behavior generalizations or even noteworthy occurrences. Such embodiments may incorporate a simple notation in such text to declare data that may be analyzed. For example, something as simple as ({fieldname}: {fieldvalue}) may be used.

Figure 6:
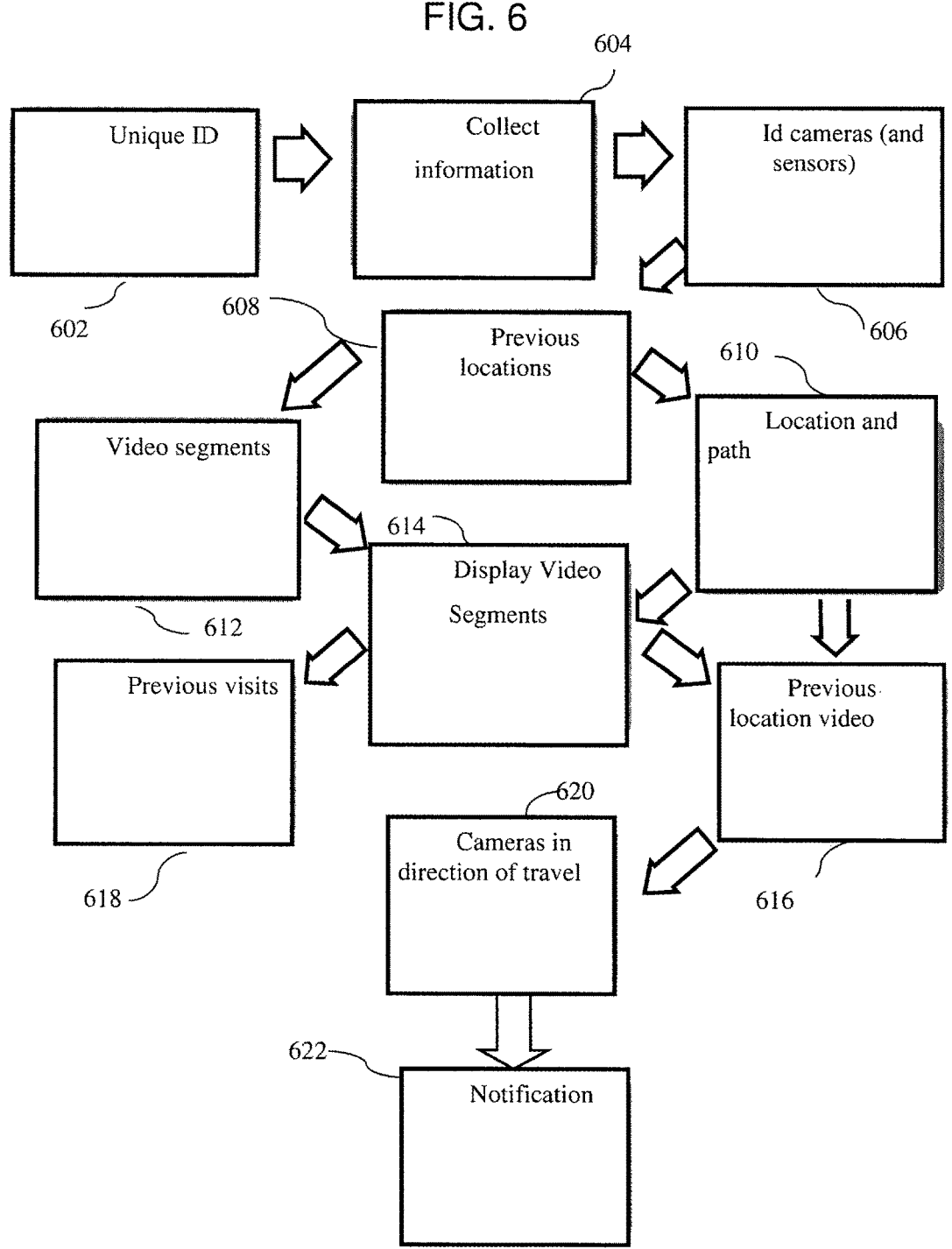
FIG. 6 shows an exemplary simplified process flow, according to some embodiments of the disclosed invention.

FIG. 6 shows an exemplary simplified process flow, according to some embodiments of the disclosed invention. As shown in block 602, a mobile device reveals its unique IDs (e.g., (MAC ID, Bluetooth ID, SIM ID, etc.) to access a WiFi access point and/or other network or sensor nodes, in a venue/location. Optionally, the unique IDs for the mobile device are filtered (as explained above) to obtain a true unique ID, which does not include false or repetitive IDs. For example, some filtering methods may be used to filter out any ID randomization of the mobile devices to obtain more accurate information. For instance, via a displayed dashboard, the system may be queried for all the device IDs in the location and filtered by time, in real time. The access point (optionally, with its sensor channel) collects coordinate and MAC ID information from the connected wireless device, in block 604. A typical WiFi communication operates in the 2.4 and 5 Ghz spectrum. In each spectrum, there are multiple channels available to be used by devices to connect, parsing out the connections across multiple channels helps avoid signal interference when many devices are using the same spectrum. In the case of 2.4 Ghz, there are 11 to 14 channels depending on the region, for the 5 Ghz spectrum there are about 23 separate channels available. This makes a higher density of connections possible).

In block 606, the invention identifies the cameras (and optionally sensors) relevant to, for example, in the vicinity and/or view point of the mobile device or an event), collects information from sensors, cameras and other relevant nodes and send the information to a analytics measurement device located on the server. Each camera has an area associated with it that corresponds to the coordinates of the locale that the camera can see. The disclosed invention then knows which camera is of interest (relevant) for a wireless device when the device traverses a specific coordinate or coordinates.

The server collects the information from all access points to know which devices are traversing which coordinates and also which video clips are associated with each device, based on the area data associated with a camera. Optionally, the analytics measurement device searches a database for the device IDs for the previous locations seen and their time stamps, in block 608.

Figure 7:
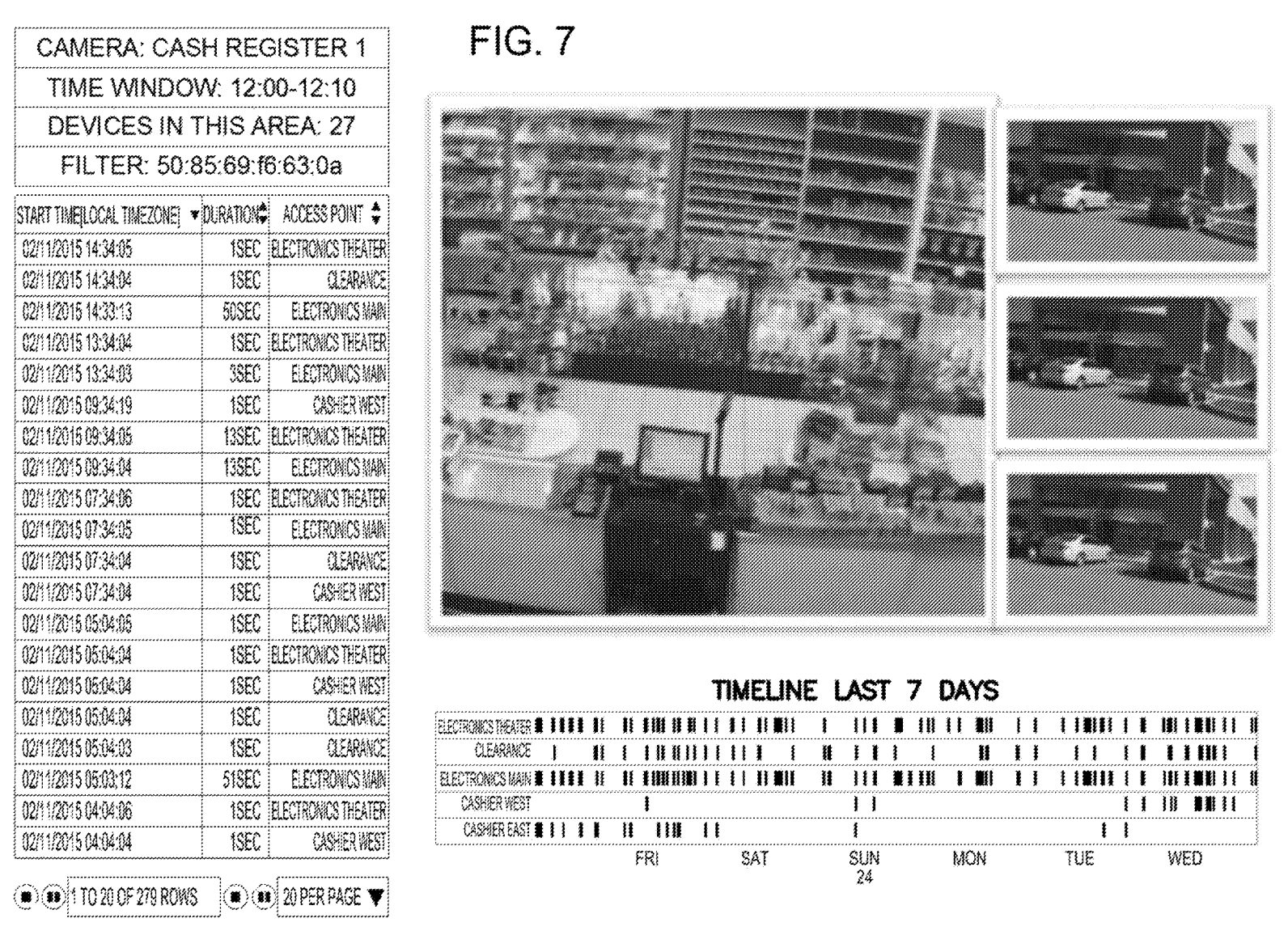
Figure 8:
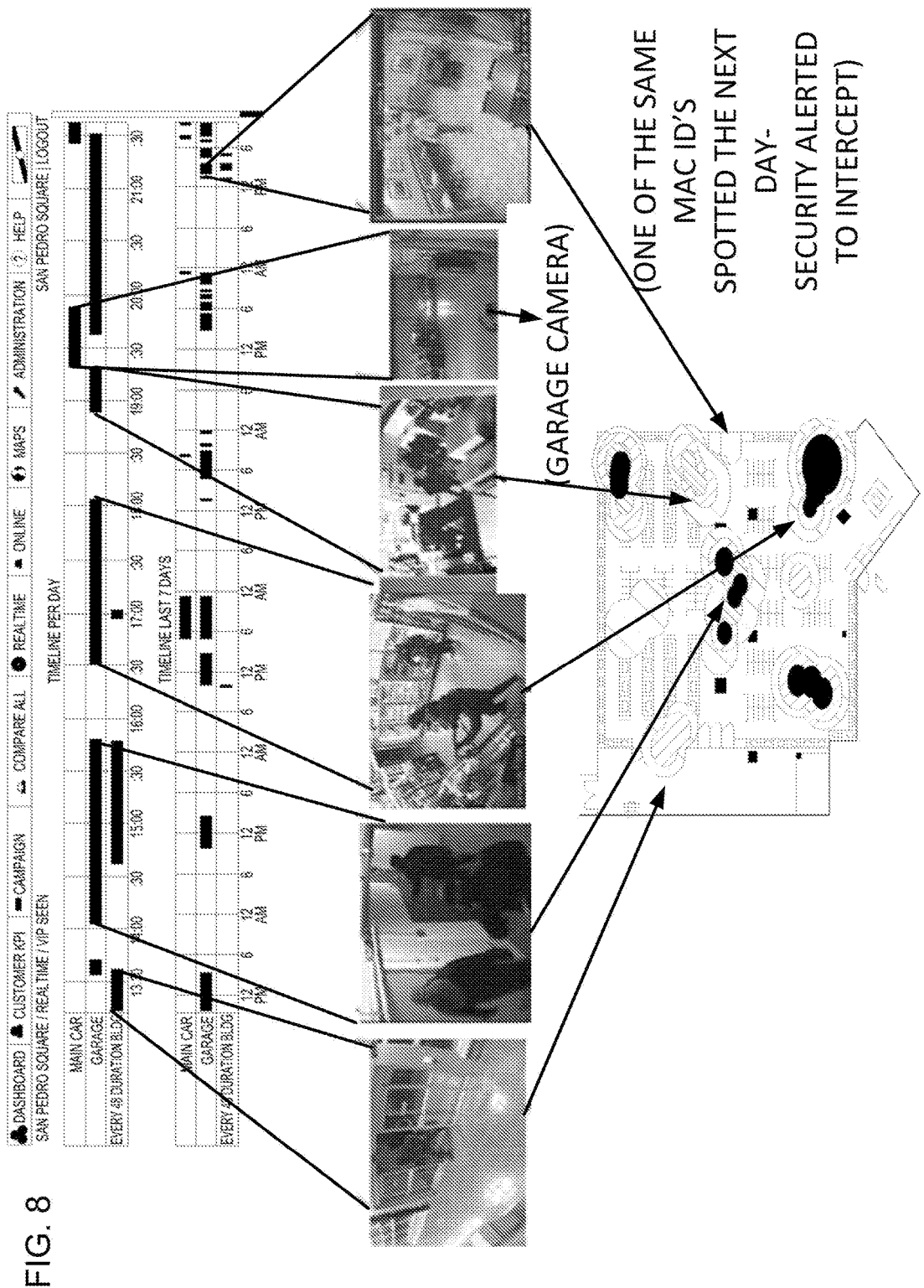
FIG. 8 is an exemplary display screen displaying timelines from the video footage from the cameras, according to some embodiments of the disclosed invention.

In block 610, the obtained information is analyzed for real time mapping of the location and predicted future path of the mobile device. The invention also accesses video storage device(s) and requests video segments based on the time stamp and camera locations, in block 612. In block 614, the invention organizes and displays the video stream segments in order of the time stamps and camera locations for each device ID that is being tracked. For example, the video footage from all known cameras in the identified locations and time frames are displayed, as s in FIG. 7, which is an exemplary display screen depicting images from all locations where the targeted devices were seen, according to some embodiments of the disclosed invention. The video footage from each phase of the event may be consolidated into a single video thread, as shown in FIG. 8, which is an exemplary display screen displaying timelines from the video footage from the cameras, according to some embodiments of the disclosed invention. In some embodiments, the device and method of the invention perform an initial review of the device IDs and information about each device to eliminate, for example, employees, equipment and non-relevant IDs. For example, by using the travel and behavior patterns, the invention is capable to distinguishing the non-relevant device IDs from those who are indeed visiting the location. This way, the device(s) of interest are quickly narrowed down and accurately identified.

Figure 9:
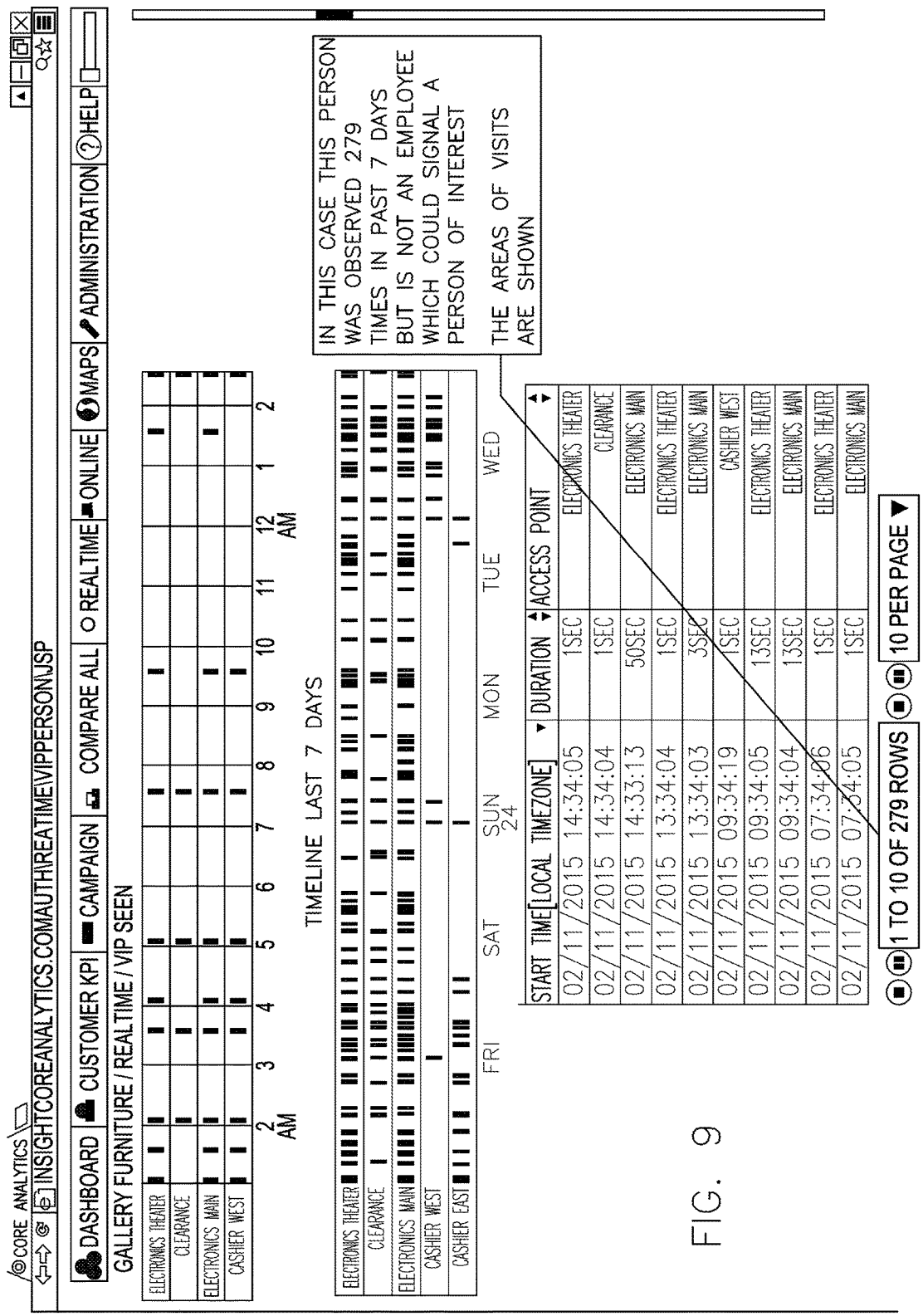
FIG. 9 is an exemplary display screen showing a view for the past visits and the location of those visits, according to some embodiments of the disclosed invention.

Previous locations and their related video images may also be optionally identified in block 616. The invention also optionally searches archives (e.g., a database) for previous visits of each mobile device, in block 618. For instance, for each device ID, a history and path analysis is displayed including all previously seen devices and the travel path may be mapped to a map of the facility, showing the locations and dwell times of the targeted device IDs. This information may be analyzed to identify potential accomplices or related parties. For example, in a case of a security breach, the invention analyzes past visit locations and the associated video frames to further a security investigation, to improve identification of the users of the mobile devices, as shown in FIG. 9, which is an exemplary display screen showing a view for the past visits and the location of those visits, according to some embodiments of the disclosed invention.

In block 620, the direction of travel is optionally predicted and may be identified on a map, depicting a map of device movements and predicted travel path, according to some embodiments of the disclosed invention.

The invention then analyzes the video information from the cameras that are in the travel path to follow the mobile device being tracked. The organized information may then be sent (e.g., streamed) to a remote location, for example, a cloud, merchant, and/or security or law enforcement personnel. In block 622, the information about the devices are saved in a database and notifications or alerts may be transmitted if the same (suspicious) mobile device visits the same site in future. Moreover, the device information and video streams can be packaged and electronically sent to interested parties, such as law enforcement or merchants along with the device IDs to identify phone numbers and addresses of suspects.

This way, for example, security or law enforcement can be alerted to possible origination of the suspected event and potential accomplices (as well as their travel paths). Additional face recognition software can be applied for improved identification of individuals during the event or post processing of the images. Alerts can be automated to trigger alarms or other actionable items and location and warning messages may be sent to relevant people (e.g., employees or security) in the direction of suspect's travel. The processes of the disclosed invention may be executed by one or more process included associated memory and circuitry, for example, a server, an access point and/or a smart camera, using instruction stored in a non-transitory computer storage medium.

In some embodiments, the invention uses predictive analysis to indicate the next locations where the individual may approach in order to focus attention by security on those cameras as well. The system can look back in time on multiple device IDs to narrow down the targets and search back in time to view videos from the beginning of an event. The system can review archival video information along with visitor ID tracking, to view earlier visits to help identify past behavior, accomplices and confederates working with the individual targeted.

Figure 10:
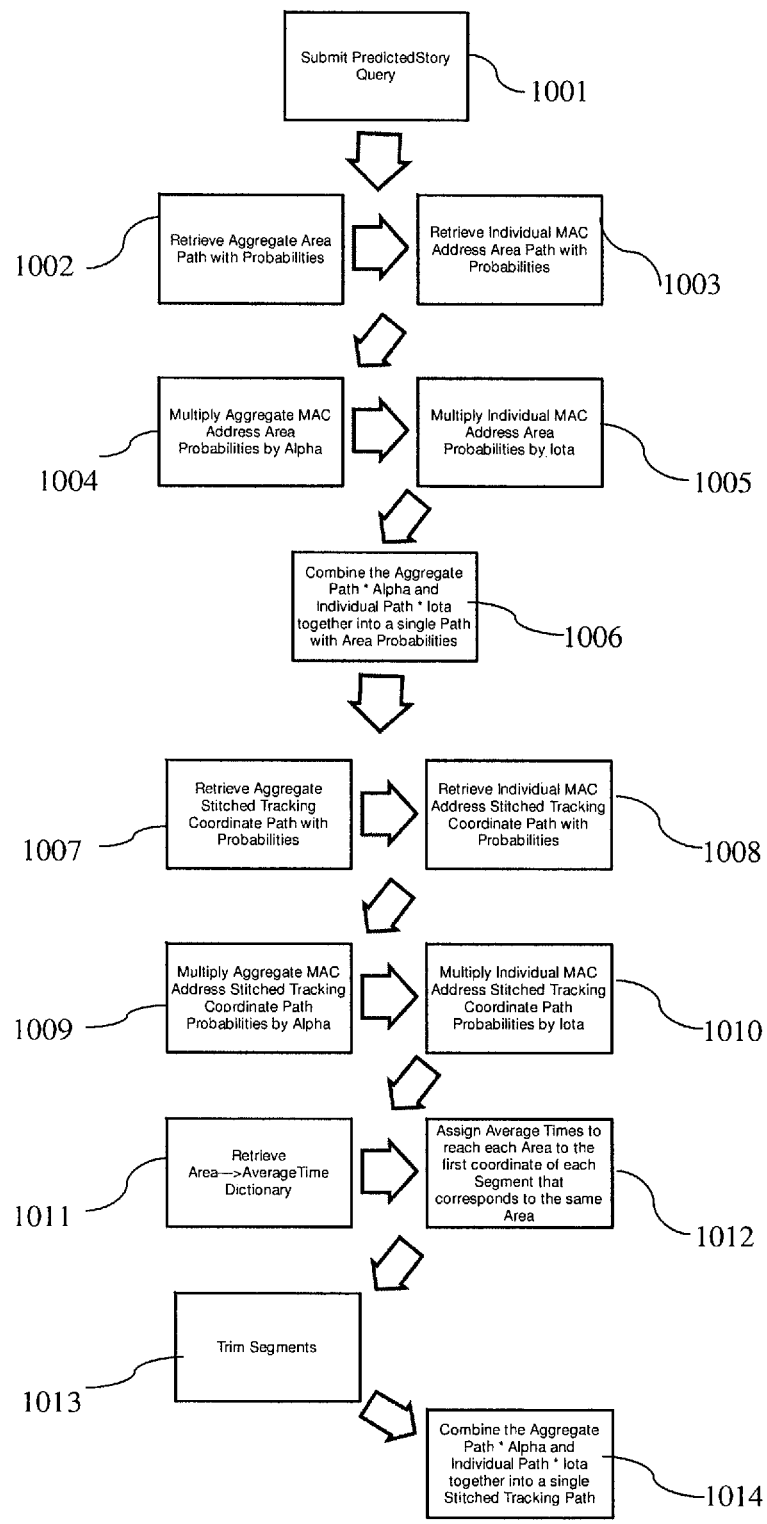
FIG. 10 is an exemplary simplified process flow for predicting location and direction of travel, according to some embodiments of the disclosed invention.

FIG. 10 is an exemplary simplified process flow for predicting location and direction of travel, according to some embodiments of the disclosed invention. In some embodiments, prior to any PredictedStory request and the corresponding query processing process flow, however, there is a continuous collection and computation taking place which continuously updates the information necessary for accurate area traversal predication results. In some embodiments, the continuous processing is as follows:

Compute and store the sequence of areas visited with timestamp.

Continuously compute and store the following Dictionaries per MAC address and per aggregate of all MAC addresses:
2 Level Dictionary with time→AreasVisitedList.
Key: Average time from Arrival, Value: List of Area Labels already visited
2 Level Dictionary Area→Average time.
Key: Area Label, Value: Average time visited by from Arrival
3 Level Dictionary with Nth Move→[Area→Probability]
Key: N, [Key: Area Label, Value: Probability of going to next] (N=0 represents outside the local environment, wherein the probabilities represent the first move into the environment).

An aggregate list of paths of areas of all MAC addresses is continuously computed.

It is computed by reading the Nth Move→[Area→Probability]Dictionary, which is read for N=0, 1, . . . and an "Area Path" constructed for each possible path up to the end time in the predictive query submitted. The probability of each complete path is easily computable by multiplying the probabilities of each area for N=0, 1, . . . traversed together to realize an aggregate probability for the whole path.

The same continuous computation is performed as above for each individual MAC address when data is received.

Referring now to FIG. 10, as shown in block 1001, a query for the predicting the location and/or direction of the travel for a visitor with a mobile WiFi device is submitted to the system. When a request (e.g., PredictedStory) is received, the intermediate data, which includes two sets of lists of area traversal paths, is retrieved (e.g., #3 and #4 above). In block 1002, each possible complete path of each areas traversed and its associated probability is retrieved for the aggregate of all MAC addresses. In block 1003, each possible complete path of areas traversed and its associated probability is retrieved, for the specific requested MAC address.

In block 1004, each complete path probability for the aggregate MAC addresses is multiplied by Alpha and in block 1005, the individual MAC address area probabilities are multiplied by Iota. That is, in block 1006, the lists retrieved in blocks 1002 and 1003 are combined by multiplying each set of Lists by a weight factor, an aggregate weight factor of "Alpha" and an individual weight factor of "Iota," for example. Different embodiments of the present invention can assign different values for Alpha and Iota based on their distinct strategies. Some embodiments of the present invention assign the values for Alpha and Iota based on the number of visits to the environment. In some embodiments, for computing the final PredictedStory with Alpha and Iota, the weight factors are computed as:

Alpha=1/(Number of Visits+1)

Iota=(Number of Visits)/(Number of Visits+1)

This example allows Alpha to have a 50% affect after the first visit but then weight more and more the individual tracking history the more visits are recorded. With a heuristic for computing Alpha and Iota, the final PredictedStory comprising multiple Area Traversal Paths with associated probability can be computed.

Now that the area traversal paths and probabilities have been computed, the possible tracking coordinate paths and associated probabilities are computed. Similar to continuously updating area traversal paths probabilities subsystem, prior to any PredictedStory request and the corresponding query processing process flow, the information necessary for accurate tracking coordinate predication results are continuously updated. In some embodiments, the continuous processing is as follows:

Compute and store the average of all tracking 3D coordinate with timestamp information per MAC address as well as per Aggregate of all MAC addresses. This may be accomplished by breaking up the 3D coordinate track for a MAC address into segments where each segment corresponds to the Area it traverses. For an individual area, each of the coordinate paths that traversed the area is averaged together by first assuming that the point in time that the segment first entered the area is time zero. The rest of a segment is assumed to include coordinates with timestamps for the number of milliseconds since the first entry. All of the segments that traversed a specific area are then averaged by averaging the coordinates that correspond to the same time since entry to the area.

Some segments will remain in a specific area for much longer than other segments. In this case, when averaging in a segment that goes longer than other segments, the segments that stopped at a particular time will average in (0, 0, 0) beyond the time the segment has recorded coordinates for. This presents the likely coordinates based on the information known.

The resulting averaged segments are computed per area for each MAC address and for the aggregate of all MAC addresses. The segments can be stitched together to form a coordinate path. The stitch sequence is similar to the area sequences assembled earlier and the probability assigned to a stitched coordinate path is the similar to its corresponding area path for which the probability is already computed. In some embodiments, one more operation is performed for the stitching—the timestamps assigned to each area's average coordinate point of entry is the average time found in the already computed "Area→Average Time" Dictionary. As such, any segment that exceeds the time for the average point of entry into the next stitched segment, must be trimmed to the time that meets the average time for the difference between the start of the next segment and next area and the start of its segment and area.

This results in an area path and a tracking coordinate path, each with an associated probability so that the collection of both area paths each with the assigned probability and tracking coordinate paths each with assigned probability may be assembled in a single PredictedStory, as the answer to a PredictedStory query.

Referring back to FIG. 10, as shown in blocks 1007 to 1013, the information for answering tracking coordinate paths and their probabilities are retrieved and computed. In block 1007, each possible completed stitch" path of tracking coordinates and its associated probability is retrieved for the aggregate of all MAC addresses. In block 1008, each possible completed stitched path of tracking coordinates and its associated probability is retrieved for the specific requested MAC address.

In block 1009, each complete path probability for the aggregate MAC addresses is multiplied by Alpha and in block 1010, the individual MAC address area probabilities are multiplied by Iota. In Block 1011, the Area→Average Time Dictionary is retrieved. In Block 1012, the stitched together tracking coordinate paths have timestamps adjusted at the start of each stitched segment based on the Area→Average Time Dictionary. In Block 1013, the list of tracking coordinate paths for aggregated Mac addresses have their probabilities multiplied by Alpha while the tracking coordinate paths for the specific Mac address have their probabilities multiplied by Iota after which the paths are combined into one set of complete tracking coordinate paths with probabilities.

The information from radio-based devices may include logs of mobile device IDs (e.g., MAC addresses), time, location (geographic and based on radio power strength), and login information collected when the Wi-Fi (e.g., guest access or customer portal) on the location is used by the individuals. In some embodiments, the information is collected from one or multiple locations and sent to cloud-based or private on-site servers for processing to generate real time detail information about both individuals and groups. This information allows the invention to interpret behavior and actions and to combine this with information from the video storage or live video feeds for immediate action or post processing for marketing, promotional and/or forensic analysis.

The analytics process using device IDs and path analysis, can be applied in real time to predict the travel path and target the relevant cameras, in real time, for immediate tracking. Forensic review can be done afterwards by combining video information of the event in question and past video information from previous visits of the identified devices. This information combined with additional demographics and other discernible details from a database and/or from social media improves investigation of the individuals involved.

In some embodiments, the invention collects information in real time to report the exact location and video feeds from the specific cameras near the individual as he moves through the location to, for example, merchants, marketing companies, site security and law enforcement and/or emergency responders. In some embodiments, alerts for future visits can be automatically generated to continue monitoring during new visits or alert authorities to the individuals' new location. Combining the video thread of the event, with path analysis and heat maps of the visit provides new insights for to manage a situation and to conduct further investigation. The invention alleviates the enormous burden of reviewing many hours and many video streams to quickly search and narrow down the target for identification and tracking.

In some embodiments, the detail information on visitor traffic, current location, predicted location and demographics is analyzed to provide reports and real time charts. Moreover, this information may also be used to customize and tailor the visitor's experience, offers and services for each visitor, individually. For example, based on this detail information, commercial offers, coupons, location based services and product finding and customer support may be customized and transmitted to the individual visitors.

The commercial offers, coupons, location based services and product finding and customer support may be communicated to the targeted users in a variety of known methods, such as, email, SMS, Text, social media platforms, loyalty cards from the merchant, captive social WiFi portal with custom HTML, and the like. This way, merchants can use the analysis of visitor transit patterns and interaction with their mobile devices, to improve services, create better visitor environments or adjust inventory, and manage their staff and operations. Furthermore, the information may be used for theft and security trends and sales management information.

In some embodiments, the disclosed invention filters out the unwanted observations/information from a measurement system that is seeking to measure traffic in a location, such as a retail shop or a public place. The invention then distinguishes the real observations from the random (false) observations that mask the real (repeat) mobile devices.

Using the different data sets, an analytics engine of the disclosed invention processes the information to present highly specific details on the device owner in order to generate targeted content, alert relevant parties and/or trigger other equipment (such as digital signage, touch tablets and kiosks) to present relevant data to the targeted device owner.

In some embodiments, the measurement system provides observations with several fields, such as: observed MAC address, observed number of detections, first seen, last seen, signal strength, and the like.

In some embodiments, the disclosed invention retrieves an object having a unique identifier including event objects for the same unique identifier. The event objects include tracking events each including a time stamped list of (x, y, z) coordinates, area events where each comprises a start time stamp and an associated area with a list of (x, y) coordinates corresponding to the precise region that a camera sees and continuously records, and video events where each comprises a start timestamp and end timestamp corresponding to the precise time period that a tracking event traversed a camera's precise associated area and including the synchronized video clip. The invention may further include an area event and an associated area with a list of (x, y) coordinates wherein the area does not correspond to a camera and partner events that are associated with the unique identifier.

In some embodiments, the disclosed invention may further include a query language that provides the means to retrieve an object that represents the predicted behavior of the object in terms of possibility objects each having a probability percentage assignment. Each possibility object may include a start and end timestamp to denote a time period, a probability of occurrence within the time period, and one or more events.

Some embodiments of the disclosed invention include a facial recognition feature to register facial features in the custom stream so that recognized faces are provided by the associated custom stream and for further rule processing.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as depicted by the appended claims and drawings.

What is claimed is:

1. A method for tracking a mobile device in a site, the method comprising:
   receiving, in real time, a plurality of different identifications for a particular mobile device visiting the site, wherein the plurality of different identifications include false or repetitive identifications for the particular mobile device;
   filtering out the plurality of different identifications for the particular mobile device to obtain a true identification for the particular mobile device, wherein the true identification does not include false or repetitive identifications for the particular mobile device;
   in real time, identifying cameras relevant to movement of the particular mobile device responsive to the true identifications for the particular mobile device;
   receiving video streams of the movement of the particular mobile device from the identified cameras, time stamping the received video streams and storing the time stamped video streams in a computer storage medium;
   generating data structures for the video streams and tracking information of the particular mobile device, the data structure including time stamped videos, and viewpoints of the identified cameras;
   utilizing the data structures to retrieve, in real time, video and tracking information for the particular mobile device and the user, as the particular mobile device moves in the site; and
   applying analytics to the retrieved video and tracking information to analyze behavior of the user and to predict what the user will do while on site.

2. The method of claim 1, wherein the data structures further include a user of the particular mobile device and regions of interests of the user of the particular mobile device.

3. The method of claim 1, wherein the data structures further include a list of one or more tracking events, video events, social events, area events, web request events, partner events, trackables, cameras, social threads, and areas, and wherein each list includes identifications that reference said each list.

4. The method of claim 1, wherein said prediction of what the user will do while on site includes one or more of predicting a future travel path of the particular mobile device, predicting what web sites the user will visit, and what products or services the user is likely to purchase.

5. The method of claim 1, further comprising utilizing said analyzed behavior of the user and said prediction of what the user will do while on site for one or more of providing products, services and offers, product placement and management, staffing support and scheduling, security or law enforcement services, and object or person tracking.

6. The method of claim 1, wherein the tracking information includes one or more of duration of the user stay on the site, physical and web locations visited by the user, apps used by the user, user profile, products looked at, and web browsing actions.

7. The method of claim 1, wherein the tracking information is obtained from one or more of a point of sales terminal, an iBeacon device and a WiFi access point.

8. The method of claim 1, further comprising generating a heat map to show real time tracking, visitor density location popularity and flow analysis of visitors within the site.

9. The method of claim 1, further comprising utilizing said analyzed behavior of the user and said prediction of what the user will do while on site to transmit or display messages from or on an interactive terminal or digital signage screen to the user.

10. The method of claim 1, further comprising identifying previous paths of the user, and matching the previous paths with the video streams of the movement of the particular mobile device for further identification of the user.

11. The method of claim 1, further comprising generating alert information when the user returns to the site.

12. A non-transitory computer storage medium including a plurality of instructions, the instructions when executed by one or more processor performing a method for tracking a mobile device in a site, the method comprising:
   receiving, in real time, a plurality of different identifications for a particular mobile device visiting the site, wherein the plurality of different identifications include false or repetitive identifications for the particular mobile device;
   filtering out the plurality of different identifications for the particular mobile device to obtain a true identification for the particular mobile device, wherein the true identification does not include false or repetitive identifications for the particular mobile device;
   in real time, identifying cameras relevant to movement of the particular mobile device responsive to the true identifications for the particular mobile device;
   receiving video streams of the movement of the particular mobile device from the identified cameras, time stamping the received video streams and storing the time stamped video streams in a computer storage medium;
   generating data structures for the video streams and tracking information of the particular mobile device, the data structure including time stamped videos, and viewpoints of the identified cameras;
   utilizing the data structures to retrieve, in real time, video and tracking information for the particular mobile device and the user, as the particular mobile device moves in the site; and
   applying analytics to the retrieved video and tracking information to analyze behavior of the user and to predict what the user will do while on site.

13. The non-transitory computer storage medium of claim 12, wherein the data structures further includes one or more of a user of the particular mobile device, regions of interests of the user of the particular mobile device, a list of one or more tracking events, video events, social events, area events, web request events, partner events, trackables, cameras, social threads, and areas, and wherein each list includes identifications that reference said each list.

14. The non-transitory computer storage medium of claim 12, wherein said prediction of what the user will do while on site includes one or more of predicting a future travel path of the particular mobile device, predicting what web sites the user will visit, and what products or services the user is likely to purchase.

15. The non-transitory computer storage medium of claim 1, further comprising instructions to execute identifying previous paths of the user, matching the previous paths with the video streams of the movement of the particular mobile device for further identification of the user, and generating alert information when the user returns to the site.

16. A system for tracking a mobile device in a site comprising:
- a plurality of cameras coupled to a computer network;
- a wireless access point for providing access to the computer network;
- a computer storage medium for storing information; and
- a server coupled to the computer network for:
  - receiving, in real time, a plurality of different identifications for a particular mobile device visiting the site, from the wireless access point via the computer network, wherein the plurality of different identifications include false or repetitive identifications for the particular mobile device;
  - filtering out the plurality of different identifications for the particular mobile device to obtain a true identification for the particular mobile device, wherein the true identification does not include false or repetitive identifications for the particular mobile device;
  - in real time, identifying relevant cameras from the plurality of camera relevant to movement of the particular mobile device responsive to the true identifications for the particular mobile device;
  - receiving video streams of the movement of the particular mobile device from the identified relevant cameras, time stamping the received video streams and storing the time stamped video streams in the computer storage medium;
  - generating data structures for the video streams and tracking information of the particular mobile device, the data structure including time stamped videos, and viewpoints of the identified cameras;
  - utilizing the data structures to retrieve, in real time, video and tracking information for the particular mobile device and the user, as the particular mobile device moves in the site; and
  - applying analytics to the retrieved video and tracking information to analyze behavior of the user and to predict what the user will do while on site.

17. The system of claim 16, wherein the data structures further include a user of the particular mobile device, regions of interests of the user of the particular mobile device, a list of one or more tracking events, video events, social events, area events, web request events, partner events, trackables, cameras, social threads, and areas, and wherein each list includes identifications that reference said each list.

18. The system of claim 16, wherein said prediction of what the user will do while on site includes one or more of predicting a future travel path of the particular mobile device, predicting what web sites the user will visit, and what products or services the user is likely to purchase.

19. The system of claim 16, wherein the server further utilizes said analyzed behavior of the user and said prediction of what the user will do while on site for one or more of providing products, services and offers, product placement and management, staffing support and scheduling, security or law enforcement services, and object or person tracking.

20. The system of claim 16, wherein the server further identifies previous paths of the user, matches the previous paths with the video streams of the movement of the particular mobile device for further identification of the user, and generates alert information when the user returns to the site.

* * * * *